Sept. 10, 1968

G. JAY ET AL

3,400,839

BALE STACKING APPARATUS AND METHOD

Filed Aug. 1, 1966

INVENTORS
GEORGE JAY
EVERETT V. RANKINS
BY
Julian Caplan
ATTORNEY

Sept. 10, 1968  G. JAY ET AL  3,400,839
BALE STACKING APPARATUS AND METHOD
Filed Aug. 1, 1966  6 Sheets-Sheet 5

INVENTORS
GEORGE JAY
EVERETT Y. RANKINS
By Julian Caplan
ATTORNEY

United States Patent Office 3,400,839
Patented Sept. 10, 1968

3,400,839
BALE STACKING APPARATUS AND METHOD
George Jay and Everett V. Rankins, both c/o Jay and Rankins, P.O. Box 132, Manteca, Calif. 95336
Filed Aug. 1, 1966, Ser. No. 569,503
21 Claims. (Cl. 214—6)

This invention relates to an improved bale stacking apparatus and method. More particularly, the invention relates to a machine which picks up conventional hay bales deposited on the ground by a conventional hay baling machine, arranges them in a stack of a pattern of layers of bales, and may be used to transport the stack to a deposit location, and then discharges the stack, while maintaining the pattern. The pattern is shaped to facilitate subsequent transportation of stacks in conventional highway hay transport trucks. Thus the subsequent restacking required after use of other field stacking machines in order to rearrange the bales in a stable stack for transportation is eliminated in the present invention. Accordingly, the invention also relates to the stack of bales produced in accordance with the apparatus and method.

A principal advantage of the invention is the fact that the machine arranges the bales in a pre-selected pattern of layers. In a preferred form of the invention the horizontal arrangement of each layer is eight foot square and preferably seven layers form the stack. In most of the layers the bales extend in two transverse rows of four bales each, but in some of the layers some of the bales are longitudinally arranged, and the interlocking pattern stabilizes the stack, eliminating the need for subsequent rearrangement.

A further feature of the invention is the fact that the machine is designed to transport a stack of bales picked up in the field to a place of deposit such as the edge of the field adjacent a highway, where the stack is later placed on a truck and transported along the highway. On the other hand, the machine can also be used for transportation over highways.

A further feature of the invention is the fact that the machine may be self-propelled and controlled by one man, thereby reducing the labor presently required in stacking bales and also materially reducing the amount of physical labor required for such purpose.

Another advantage of the invention is the reduction in the amount of movement of the bale as compared with other machines of this general type. Reduction in movement of the bales reduces the likelihood of loosening the bales or the baling wires or scattering the hay. It also reduces loss of nutritional value of leaves which might otherwise be lost.

A still further feature of the invention is the fact that the outer ends of the bales are forced inward to square the sides of the stack. This feature of the invention is of considerable advantage in highway transportation, particularly in that it lessens the likelihood of an overhanging load which may violate traffic regulations. It will be understood that although nominally bales are of uniform length, nevertheless they are not uniform in practice. Unless the sides of each layer of bales are squared, the longer bales will project relative to the shorter and cause difficulty in subsequent handling and transportation. This problem is overcome in accordance with the invention.

Another feature of the invention is the use of mechanisms for actuating moving parts of the machine which have reduced the numbers of actuating mechanisms such as hydraulic or pneumatic cylinders and motors and enable a number of said actuators to perform dual functions by sequential operation of said mechanisms.

Many additional advantages of the invention result from the fact that the stack pattern (with interlocking bales stabilizing the stack) is established by the apparatus when the bales are initially set in place and there is no need to rearrange the stack at any time, up to the time of consumption.

One such advantage is that if a baling wire breaks in the stack or if a bale is otherwise broken, the other bales hold the hay in place, reducing loss.

Another such advantage is the fact that the stack tends to settle, the weight of superimposed bales causing compression of lower bales in an interlocking pattern which further stabilizes the stack and aids in maintaining the shape of the stack when it is stored, lifted on a truck or transported.

Important nutritional values occur in the practice of the invention. Thus handling of the bales from field to consumer is reduced. This saves leaves and foliage and also insures that only a minimum surface area of each bale is exposed to sun and weather, thereby reducing discoloration and withering.

The foregoing results in uniformity of quality since a package of 56 bales (e.g.) is formed and maintained intact until fed to cattle and the parts of the bales not exposed to atmosphere are maintained unaffected by sun and weather.

It is customary in prior hay handling to stack bales at the edge of a field and maintain the stack intact for 30–45 days while the cure of the hay is completed. Hay balers refer to hay "sweating" during this portion of the curing cycle. If the stack is disturbed in this time period, the "sweat" is "broken" and the hay is less palatable to cattle and its nutritional value is believed to be impaired. The stable stack of the present invention, however, can be transported during the sweating period because lifting and transporting the package or stack does not disturb the bales or enable air to interfere with the sweating process.

The present invention has been developed in the Central Valley of California where standard alfalfa hay bales are dimensioned 16 x 23 x 48 inches and weigh approximately 125 lbs. The machine hereinafter described stacks 56 such bales in seven layers of eight bales each. However, the machine can readily be adapted to handle bales of other dimensions and the number of bales in the stack and arrangement of layers may be varied by adjustment of dimensions of the machine which will readily occur to one skilled in this art.

In the description which follows, the machine is self-propelled. However, the machine may be tractor-drawn and actuated in whole or in part by power take-off from the tractor or a ground wheel.

Other objects of the present invention will become apparent upon reading the following specification and referring to the accompanying drawings in which similar characters of reference represent corresponding parts in each of the several views.

For the purpose of the following description, it will be assumed that the machine is to handle a conventional hay bale 10 formed by conventional baling machines having cross-sectional dimensions of 16 inches by 23 inches, as determined by the shape of the baling chamber. On the other hand, the lengths of such bales although nominally 48 inches, actually vary because of mechanical imperfections of the length limiting mechanisms of the machine. The bales are held in place by baling wires (not shown), usually three wires per bale. Such bales are discharged from the tail gate of the machine onto the field with one of the 16 x 48 inch sides resting on the ground and with the 48 inch dimension extending longitudinally of the path of travel of the baling machine, which path of travel is the same as that of the instant machine. The present invention picks up and stacks such bales as hereinafter described.

Figure 11:
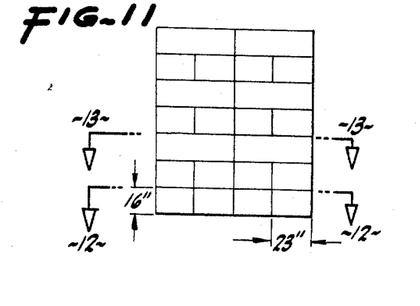
FIG. 11 is a schematic side elevational view of a stack of bales formed in accordance with the present invention.
Figure 12:
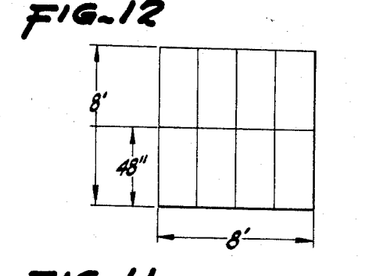
FIGS. 12 and 13 are respectively horizontal sectional views taken substantially along the lines 12—12 and 13—13 of FIG. 11.
Figure 13:
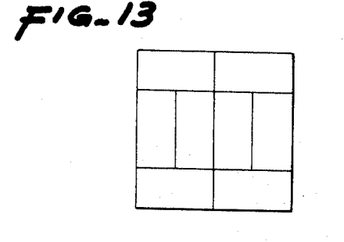

The ultimate pattern of the stack, although subject to certain variations within the limitations of the present machine, preferably has horizontal dimensions of 8 feet by 8 feet and a height of 9 feet 6 inches. There are seven layers of bales, each 16 inches high. Referring to FIG. 11, the two lowermost layers, the middle layer and the two uppermost layers are identical. As shown in FIG. 12 (showing the first layer), the nominal 48 inch dimension edges extend transversely of the machine so that there are two rows meeting at the longitudinal center line of the machine, and each row consisting of four bales. The third and fifth layers are shown in FIG. 13. In such layers there are four transverse bales in a row down the center and two longitudinally extending bales at each side. The interlocking of the longitudinally disposed bales in the stack tends to stabilize the stack and reduce any tendency to tip or slide during handling of the stack.

A feature of the arrangement, as hereinafter described, is the fact that the sides of the stack are relatively smooth and straight. As has been mentioned, the bales are only nominally 48 inches in length, but frequently are of shorter length. Where short bales are handled, they are located in the layer with their outer edges flush with the sides of the stack and any gap occasioned by a shorter length of the bale is accommodated by a hollow center. Such hollow does not interfere materially with the formation of the stable stack.

*Frames and loading platform*

The main frame 21 of the machine has four vertical corner posts 22. The two front posts 22 are interconnected adjacent their lower ends by a horizontal transverse member 23 and at least one horizontal transverse member 24 elevated above the bottom member. At each side is a bottom longitudinal horizontal member 26 which is supported by ground engaging rear wheels 27. A plurality of longitudinal side members 28 and cross ties 29 rigidly tie the sides of the main frame. The back of main frame 21 is open for discharge of the stack except for a horizontal transverse tie 31 at the top and a pivoted tail gate 32, held closed by remotely-manually controlled latch 33.

Forwardly of main frame 21 and rigidly connected to the horizontal member 23 is front frame 36 consisting of longitudinal and transverse members 37, 38 which support engine 39 which provides motive power for the front wheels 41 and also drives a pump (not shown), which energizes the various hydraulic cylinders and motors hereinafter described. An operator's seat 42 is located on frame 21 at the top on the left hand side of the machine having a steering wheel 43 to turn front wheels 41 and also having a console 44 for a plurality of hydraulic controls conveniently located beside the operator to control energization of the various motors and cylinders.

Normally horizontal and vertically reciprocating bale support platform 46 is disposed within the confines of the four corner posts 22. Preferably each post 22 has an inward extending lip 47 functioning as a track and each corner of platform 46 is provided with a rotatably mounted grooved guide roller 48 which receives lip 47 and guide platform 46 in its vertical reciprocation. Platform 46 is preferably 8 feet by 8 feet in size in order to receive a stack of the dimensions heretofore described. A horizontally disposed double-acting hydraulic cylinder 49 is mounted on front frame 36. The forward extending rod 51 of cylinder 49 is provided with four pulleys 52 rotatable in crosshead 53 having rollers 54 rolling on horizontal longitudinal guide rails 56 supported by front frame 36. Four cables 57 are fixed to frame 46 by clips 58 and each passes around a pulley 52, and the cables are guided by pulleys 59 disposed on frame 21 so as to pass around top pulleys 61 rotatably mounted at the top of each corner post 22. The ends of the cables 57 are attached to each of the four corners of platform 46. Extension and retraction of rod 51 controls vertical movement of platform 46, and because of the arrangement of the pulleys 59, 61 and cables 57, there is a two-to-one movement.

Figure 3:
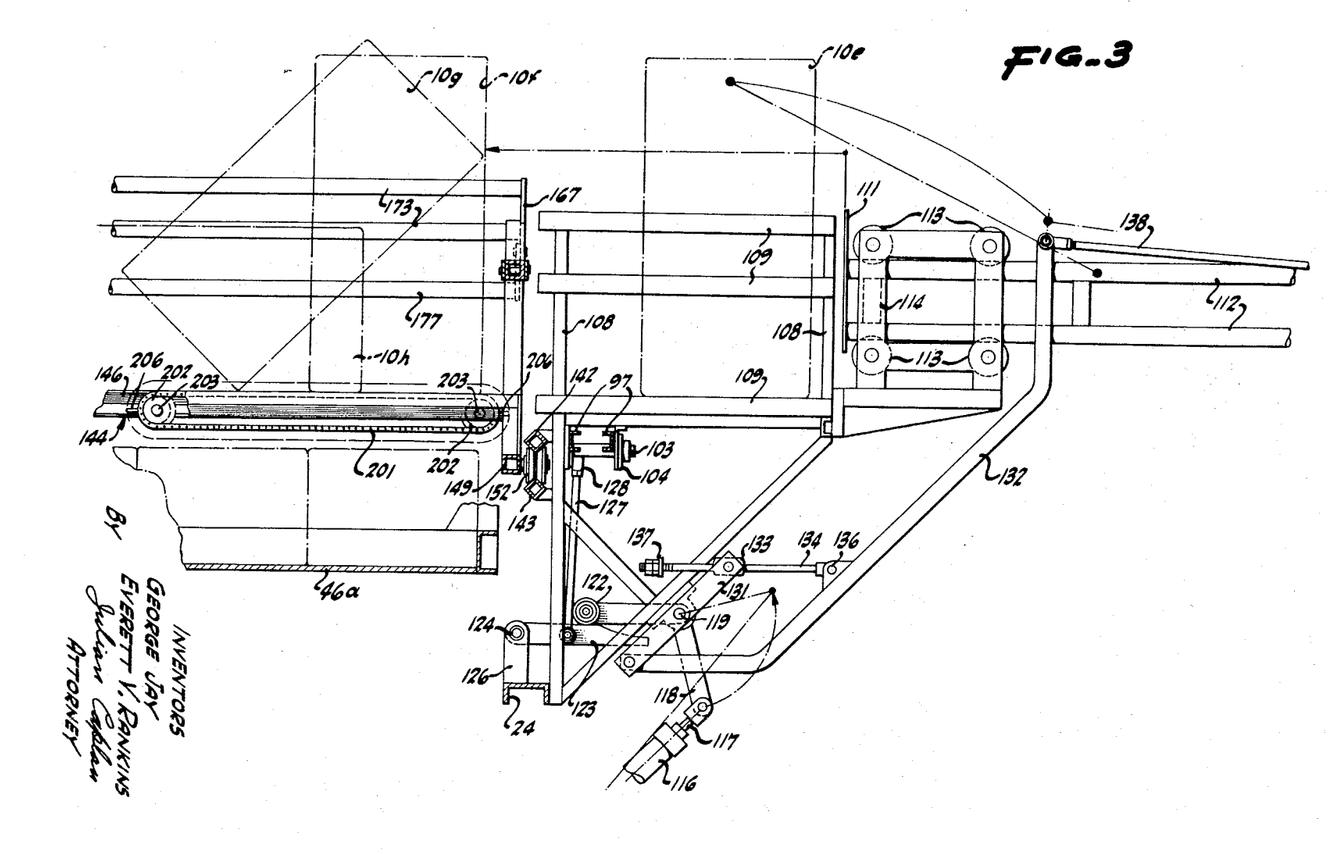
FIG. 3 is a sectional view taken substantially along the line 3—3 of FIG. 2.

The uppermost elevation of platform 46 is indicated by reference numeral 46a in FIG. 3, and platform 46 is raised to such level for deposit of the first layer of bales (the lowermost layer of the ultimate stack). After the first layer has been deposited, platform 46 is lowered 16 inches (by means of cylinder 49) and the second layer is deposited and the procedure is repeated until seven layers have been deposited. The level of the platform 46 after the seventh layer has been deposited is indicated by reference numeral 46b in FIG. 1. Level 46b is the normal horizontal transportation position of the platform in the machine and enables the machine to transport the stack to a location of deposit without danger of interference with clearance of the roadway or fields being traversed.

Figure 1:
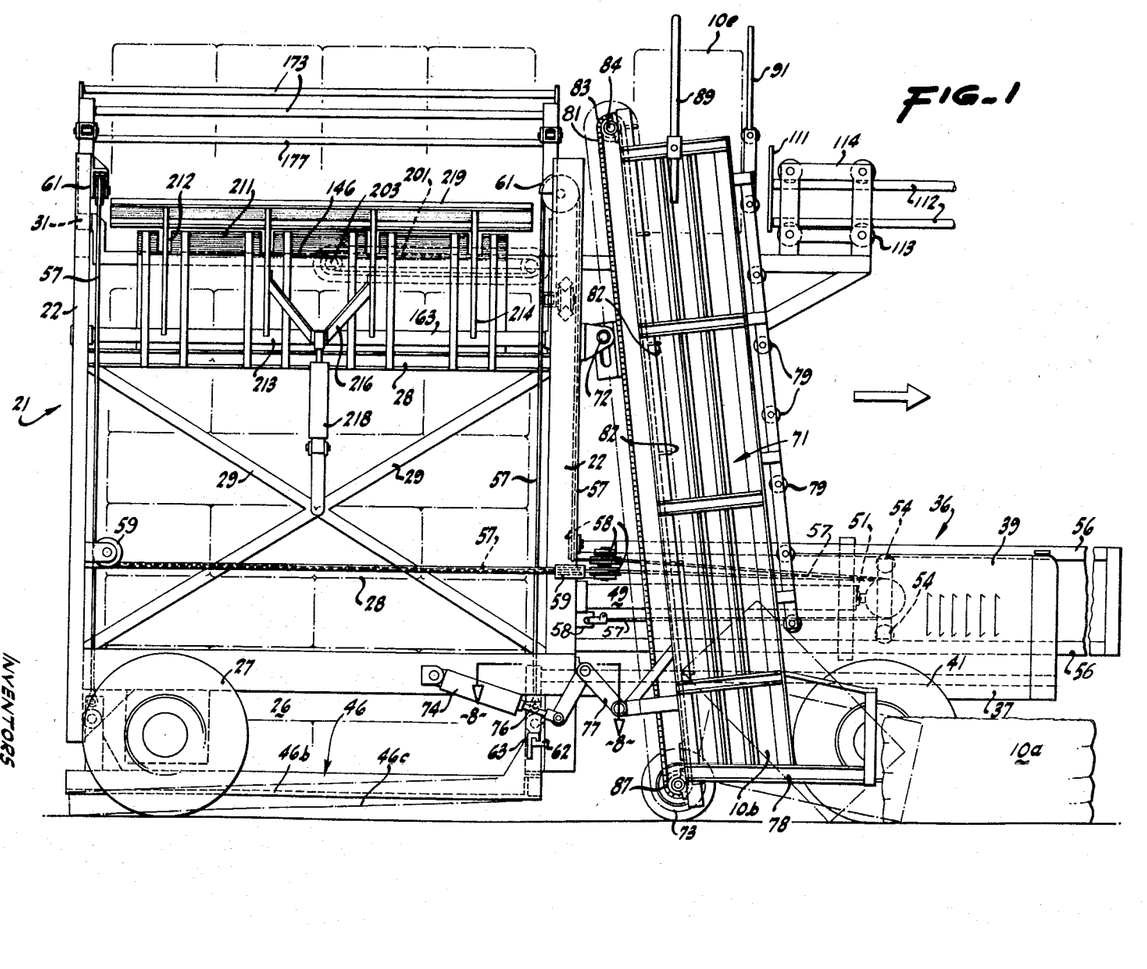
FIG. 1 is a side elevation of the machine.

In order to discharge any stack from the machine, provision is made for tilting platform 46 to the tilted position 46c in FIG. 1. To accomplish this operation, stationary hook-shaped members 62 are fixed to front posts 22 and cooperating hooks 63 are fixed to the front corners of platform 46. Said hooks 62, 63 interengage when the platform is at the level 46b. Further retraction of rod 51 slackens the four cables 57. The rear cables 57 lower the rear end of platform 46 to the ultimate discharge position 46c but the hooks 62, 63 at the front prevent the forward edge of the platform from lowering. Thus the rear end of the platform tilts downward in the discharge position.

After the machine has been transported to the position of deposit and platform 46 is tilted to the position indicated by 46c, the stack may be discharged onto the ground. For such purpose there is provided a longitudinal hydraulic cylinder 66 mounted on the front frame 36 with its rod 67 facing rearward through a hole in member 23 and fixed to transverse horizontal pusher 68 located at about the level of the two lowermost layers of the bale (see FIG. 8). When cylinder 66 is energized, pusher 68 pushes the stack off platform 46 onto the ground as the operator drives the machine forwardly at approximately the same rate as the pusher is moving rearwardly. Guide rods 69 fixed to pusher 68 extend through apertures in member 23 to hold pusher 68 in horizontal alignment. Tailgate 32 is unlatched and hence the back of the machine is open for discharge of the stack in such manner.

*Bale pickup elevator and top bale transfer*

Bales 10 are deposited by the baling machine in a line at spaced intervals resting upon one of their 16″ by 48″ faces. The operator steers the machine along such line so that the right-hand side of the machine encounters the bales in order. Bale pickup chute 71 on the right side of the machine is generally upwardly-rearwardly tilted and is pivoted at the top by a slot and pin connection 72 to the right front post 22 and supported at the bottom by ground wheel 73 and movable between a working position (FIG. 1) and a transportation position by means of hydraulic cylinder 74 mounted on member 26 whose rod 76 is connected to link 77 which is pivoted to frame 21 and to chute 71. When the machine is being transported, rod 76 is extended and chute 71 is elevated by pivoting forwardly and upward as viewed in FIG. 1.

Chute 71 is rectangular in cross section and of an open framework construction dimensioned to fit bales 10 and is also open at the bottom and has forwardly directed horizontal guides 78 between which the bale 10 is received. The front of chute 71 is provided with antifriction horizontal transverse rollers 79 at spaced intervals. Mounted on the rear of chute 71 and offset toward the outer edge thereof are vertical chains 81 having spaced lugs 82 which extend toward the front. Chains 81 pass around top sprockets 83 mounted on horizontal transverse drive shaft 84 at the top, shaft 84 being driven by hydraulic motor 86. Idler sprockets 87 are located at the bottom of chute 71. As each bale 10a encounters lugs 82, the bale is lifted in the chute to the position indicated by reference numeral 10b in FIG. 1. The right-hand side of chute 71 is provided with a top turning roller 88 and the left-hand side is provided with an inwardly curved guide rod 89. Thus as it is lifted to the top of chute 46 by lugs 82, bale 10c is tilted to the right as viewed in FIG. 4, top roller 88 serving as a fulcrum. Support 91 prevents longitudinal displacement of the bale 10d as it turns and falls onto tilting platform 96.

Figures 4, 5, 8:
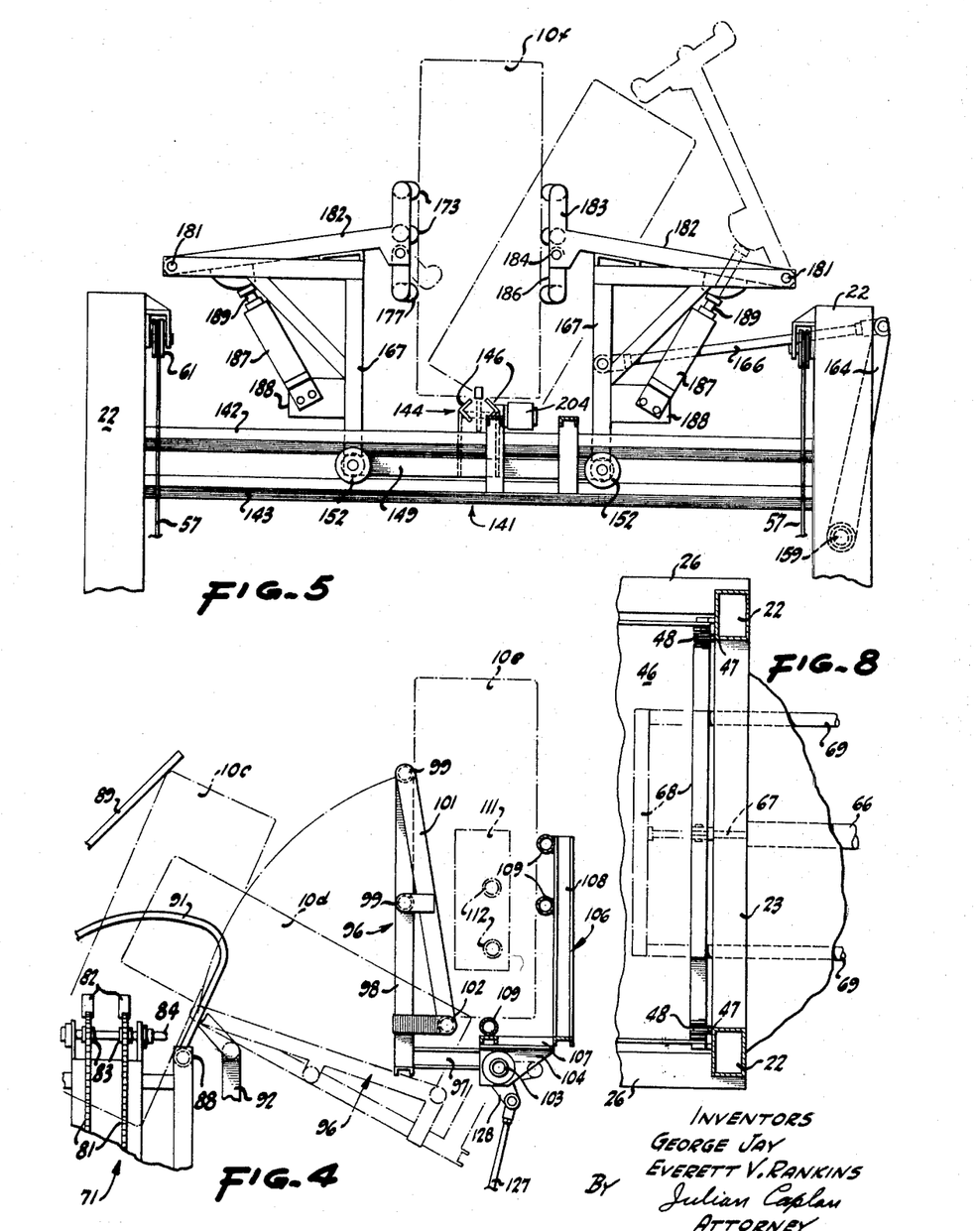
FIG. 4 is a fragmentary sectional view taken substantially along the line 4—4 of FIG. 2.
FIG. 5 is a fragmentary transverse sectional view taken substantially along the line 5—5 of FIG. 2.
FIG. 8 is a fragmentary sectional view taken substantially along the line 8—8 of FIG. 1.

Tilting platform 96 functions to tilt bale 10d from its downward-inward position shown in FIG. 4 to upright position 10e and thus platform 96 moves from dotted line slanted position (resting on support 92 fixed to frame 21) to upright solid line position. Platform 96 has short first arms 97 and extended second arms 98 at right angles thereto interconnected by longitudinal ties 99 which also function as slides. To prevent forward displacement of bale 10d, an angularly disposed guide 101 is fixed to front arm 97 and provided with a longitudinal slide 102 on which the bottom of bale 10e partially rests. First arms 97 are fixed to pivot shaft 103 which is longitudinally-horizontally mounted on frame 21 by brackets 104. As shaft 103 oscillates, platform 96 tilts. The actuation of shaft 103 is hereinafter explained.

Mounted on frame 21 centrally of the machine is a bale receiving platform 106 having horizontal bottom members 107 and vertical side members 108. To reduce friction the bale rests on longitudinal slides 109 fixed to members 107 and 108. When bale 10e reaches the position indicated in FIGS. 3 and 4, it rests partially upon the bottom slide 102 of tilting platform 96 and partly on bottom slide 109 of stationary platform 106 and is supported upright by slides 99 and 109 on opposite sides of the bale.

To move the bale from the position shown as reference numeral 10e in FIG. 3 rearwardly off platforms 96 and 106, a horizontally longitudinally reciprocating pusher 111 is provided. Pusher 111 engages the front of bale 10e. Upper and lower bars 112 extend forwardly-horizontally from pusher plate 111. Bars 112 are received between four grooved rollers 113 having transverse horizontal axes, rollers 113 being mounted in a horizontal longitudinal frame 114 fixed to bale receiving platform 106.

Figure 9:
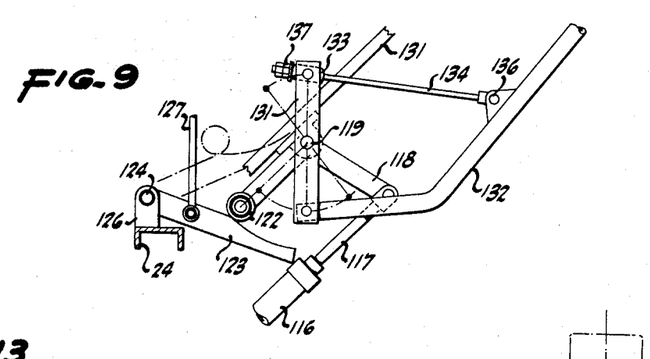
FIG. 9 is a fragmentary view showing a portion of the elements of FIG. 3 in a different position in the cycle of operation.

Tilting of tilting platform 96 and movement of pusher 111 are accomplished by a double-acting hydraulic cylinder 116 mounted on frame 21 in sequential operation. For such purpose as best illustrated in FIGS. 3, 4 and 9, rod 117 of cylinder 116 is connected to a bell crank 118 pivoted by means of pivot shaft 119 to brackets 121 projecting forwardly from main frame 21. A cam follower roller 122 is mounted on the arm of bell crank 118 opposite rod 117 and engages cam lever 123 which is pivoted by means of pin 124 to bracket 126 also mounted on frame 21. Cam lever 123 is pivotally attached to connecting rod 127, the upper end of which is attached to crank arm 128 fixed for rotation with shaft 103. The configuration of cam lever 123 is such that at the beginning of the projected movement of rod 117, cam roller 122 causes cam lever 123 to pivot in a clockwise direction as viewed in FIG. 3, thereby pulling down on connecting rod 127 causing tilting platform 96 to move from dotted line position in FIG. 4 to solid line position. The shape of cam lever 123 is such that further extension of rod 117 causes no further tilting of platform 96 beyond solid line position, although rod 117 is only partially extended when platform 96 is upright.

Also fixed to shaft 119 is arm 131 projecting outwardly to either side thereof. The lower end of arm 131 is pinned to an irregularly-shaped arm 132 which extends upwardly-forwardly to a position in front of frame 114. The other end of arm 131 has a slide 133 which slides on rod 134 pinned by means of pin 136 to arm 132, rod 134 having a stop 137 at its outer end. Rod 134 provides a lost-motion connection such that on projection of rod 117 there is only a short movement of irregularly shaped arm 132 until slide 133 encounters stop 137 and the sequence of this movement is such that the tilting platform 96 has already reached upright position before slide 133 engages stop 137. After slide 133 engages stop 137, rod 117 causes irregularly shaped arm 132 to tilt in a compound motion in a generally counter-clockwise direction as viewed in FIG. 3. The upper end of irregularly shaped arm 132 is pivotally connected to a connecting rod 138, the forward end of which is pivotally connected by means of pin 139 to frame 114. Accordingly, after tilting platform 96 has reached its upright position and the bale is in the position indicated by reference number 10e, further extension of rod 117 causes rearward movement of pusher 111 and pushes bale 10e rearwardly off platforms 96 and 106 to the position indicated by reference number 10f.

*Transverse tilting mechanism*

Immediately behind the horizontal bale receiving platform 106 is the top transverse tilting station 141. Extending transversely-horizontally between front corner posts 22 are top and bottom front tracks 142, 143. The top surface of transverse tie 31 at the rear of the machine constitutes a rear track. A transversely movable carriage 144 is provided comprising a pair of longitudinal-horizontal inverted angle members 146 which function as supports for the bottom of the bales while supported by carriage 144 and members 146 are connected by brackets 147, 148 to front and back transverse horizontal carriage members 149, 151. Front horizontal member 149 has grooved rollers 152 which are engaged by front tracks 141 and rear carriage member 151 had rollers 153 which rest on rear track 31. Mounted at the rear of the machine and fastened by bracket 154 to transverse tie 31 is a double-acting hydraulic cylinder 156. The rod 157 of the cylinder 156 is connected to crank arm 158 mounted on horizontal longitudinal shaft 159. Likewise mounted on crank arm 158 is connecting rod 161 which is pivoted to rear carriage member 151. The forward end of shaft 159 extends inside pipe 163 to the front of main frame 21 and carries a crank arm 164 which is pivoted to front connecting rod 166 which is in turn pivoted to upward extension 167 of front carriage member 149. As the rod 157 of cylinder 166 projects and retracts, carriage 144 is caused to move transversely of the machine.

Figure 6:
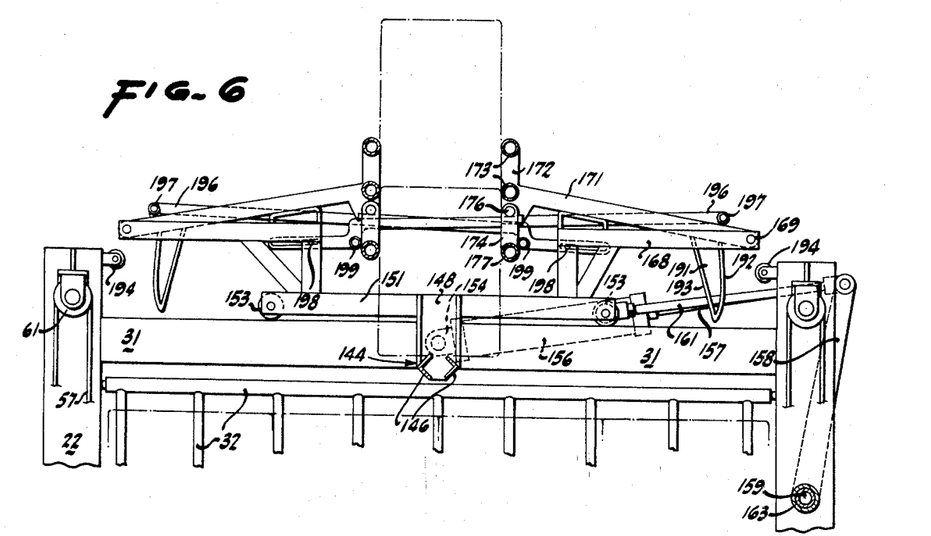
FIG. 6 is a sectional view taken substantially along the line 6—6 of FIG. 2.
Figure 7:
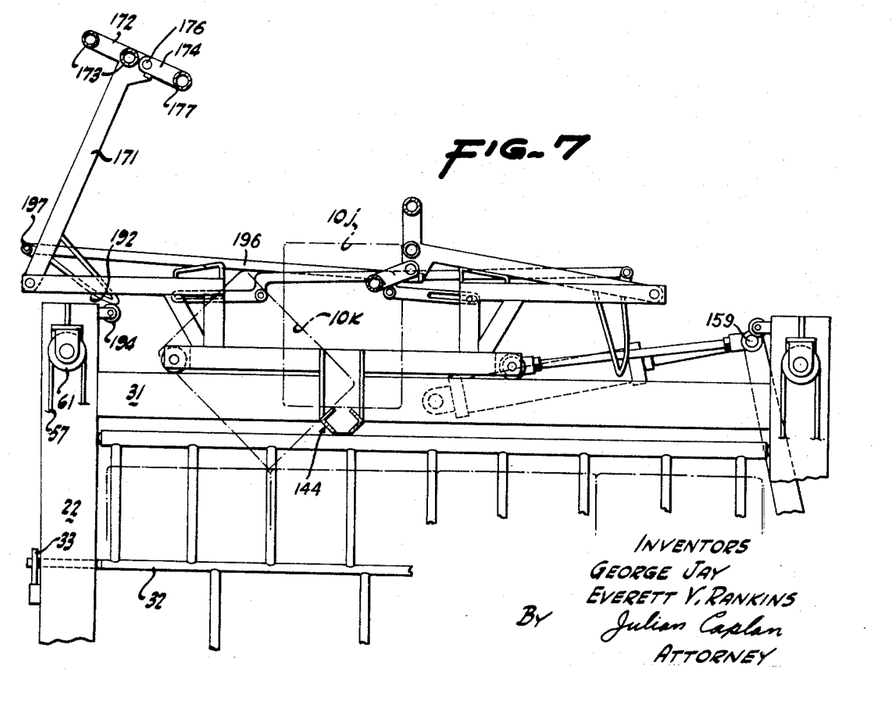
FIG. 7 is a view similar to FIG. 6 showing the parts in a different position in their cycle of operation.

At the rear of the machine, as best shown in FIGS. 6 and 7, is a tilting mechanism. Projecting up from rear carriage member 151 on each side of the machine is a bracket 168 extending laterally of the machine above the level of the top of cornerpost 22. Pivoted by means of pin 169 to the outer end of bracket 168 is inwardly and slightly upwardly slanted tilt member 171 on each side of the machine having an extension 172 to which is affixed a pair of longitudinal horizontal rods 173 which are vertically spaced apart. A link 174 is pivoted by pin 176 to the lower end of member 171 and carries a third horizontal longitudinal rod 177.

At the forward end of the machine, as best shown in FIG. 5, front carriage member 149 is provided with an upstanding L-shaped bracket 167, to the outer end of which is pivoted by means of pin 181 an inwardly extending member 182 having an upward extension 183. The forward ends of rods 173 are affixed to extension 183. Depending from member 182 and pivoted thereto by means of pin 184 is a link 186 which receives the forward end of the third rod 177.

On one side of the machine is a double-acting cylinder 187, one end of which is pivoted to bracket 188 on extension 167 and the other end of which has a rod 189 which slidingly engages the underside of member 182. Extension of rod 189 causes upward pivotal movement of member 182 and rods 173 about pin 181 as a center.

Figure 2:
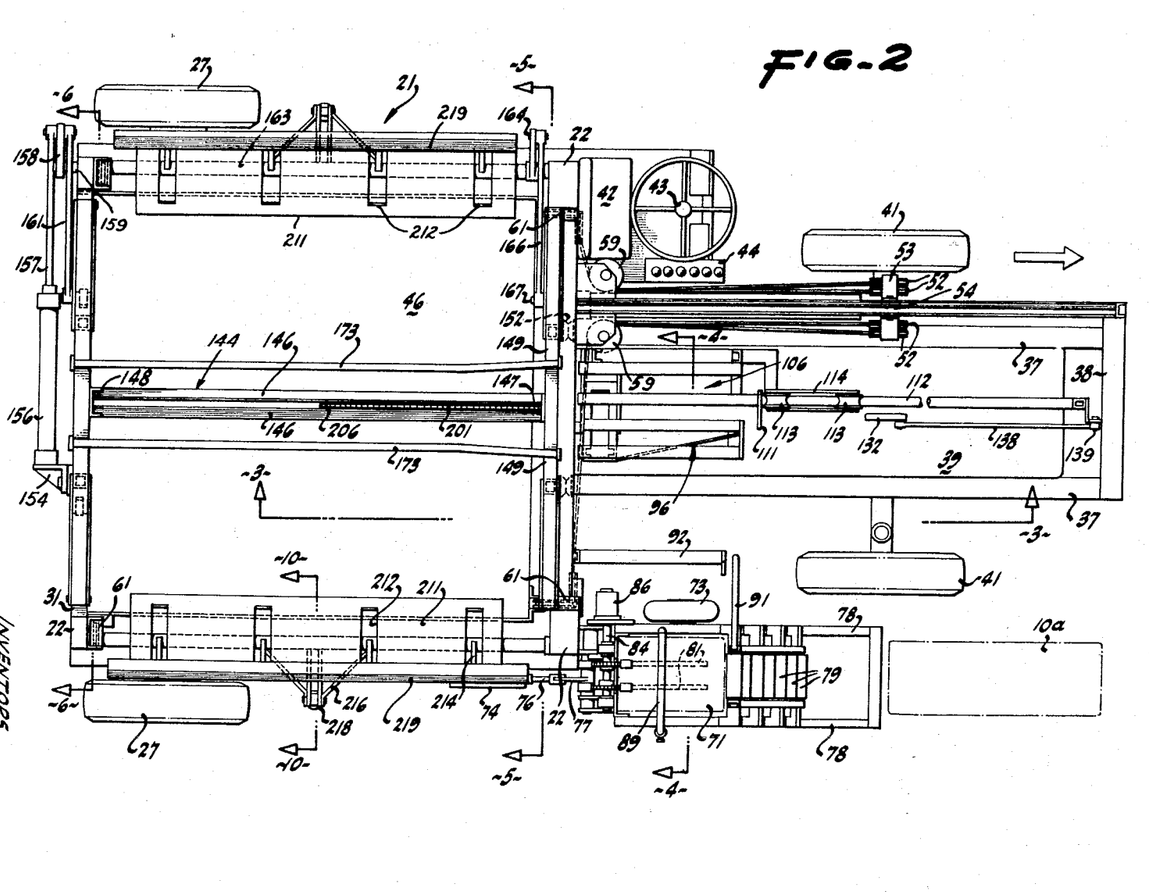
FIG. 2 is a top plan thereof.

When bales 10e are pushed off bale receiving platforms 96, 106, they slide rearwardly resting on the upper edges of carriage members 146. The bales are held against tipping by the three rods 173, 177. As best seen in FIG. 2 the forward ends of rods 173 are spaced farther apart than the rearward ends thereof for reasons which hereinafter appear.

Returning now to FIGS. 6 and 7, means supplementing cylinders 187 are provided for tipping the bales from their position of rest on horizontal longitudinal carriage members 146 in order to lay the bales into the pattern which has been heretofore described. For such purpose, there depends from each of members 171 a cam member 191 having a curved cam surface 192 and a rigidifying support 193. A cam roller 194 is fixed to the tops of rear corner posts 22. When the carriage 144 moves to the left from the position in FIG. 6 to the position in FIG. 7, cam 192 engages roller 194 causing member 171 to tilt in a counterclockwise direction about pivot 169 and in so doing the left side rods 173, 177 are moved out of contact with the bale to permit the bale to tilt to the left as viewed in FIG. 7.

For positive tilting movement, an extended transverse connecting rod 196 is provided having at the left end, as viewed in FIG. 6, a roller 197 which rides on the top surface of member 171. The opposite end of rod is slotted and has a sliding slot and pin connection 198 with bracket 168. A roller 199 is mounted on rod 196 which normally engages the outer edge of link 174. When left member 171 is raised to the position shown in FIG. 7, rod 196 is pulled to the left, by reason of contact of roller 196 with the top surface of member 171, which causes roller 199 to push right link 174 counterclockwise to the position shown in FIG. 7, which causes right rod 177 to push the bale 10j to the left, causing it to fall counterclockwise into the position shown by reference numeral 10k in FIG. 7.

When the carriage moves to the right, corresponding linkage arrangements cause a tilting of the bale in a clockwise direction.

Thus at the limit of each transverse movement of the carriage rollers 194 cause bale tilting. At intermediate carriage positions, tilting is accomplished by cylinders 187 lifting both members 182 and 171. The function of cross connecting rods 196 and rollers 199 to pivot rods 177 is the same in each instance.

The forward part of carriage 144 carries a longitudinal horizontal conveyer chain 201 which passes around sprockets 202 mounted on transverse shafts 203, the front shaft being a drive shaft and driven by hydraulic motor 204. Chain 201 carries two lugs 206 which, as best shown in FIG. 3, have an inoperative position where both are disposed below the level of the upper edge of horizontal longitudinal members 146. However, when chain 201 is turned in a counterclockwise direction as viewed in FIG. 3, the lugs 206 come into operative position for the purpose of tilting the bale from the position designated as 10f in FIG. 3 to an intermediate slanted position 10g and thence to a horizontal position 10h for the purpose of locating the longitudinally extending four outermost bales shown in FIG. 13. The chain 201 is energized only for the purpose of locating the four bales for that position, but is normally in the home or inoperative position shown in FIG. 3. When the chain 201 is turned, the bottom end of the bale is urged rearwardly, but the upper end is held back by the inward-bent forward edges of rods 173. This unbalances the bale and causes it to tilt longitudinally from positions 10f to 10h. A second bale similarly longitudinally tilted forces the first to the rear of the machine—see reference numeral 10j in FIG. 7.

*Side squaring mechanism*

Figure 10:
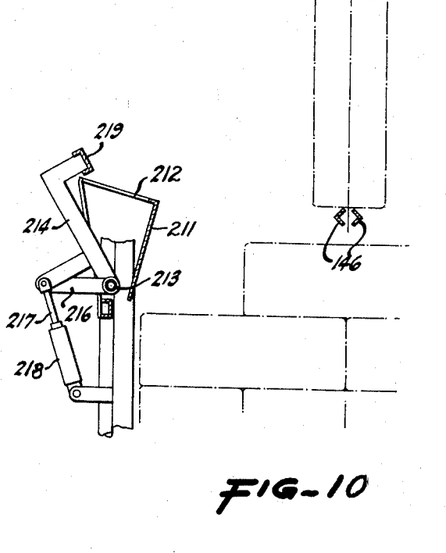
FIG. 10 is a fragmentary sectional view taken substantially along the line 10—10 of FIG. 2.

Nominally the bales 10 are 48 inches in length and if tilted transversely as shown in FIGS. 5 and 7 would automatically assume the pattern shown in FIG. 12. However, the bales frequently are of lesser length. As the bales tilt, they tend to fall slightly outward of the center line of the machine and project toward the sides. Accordingly, means is provided to square the stack. Referring particularly to FIG. 10, extending longitudinally along either side of the top of main frame 21 is a ledge or rest 211 which is a right angle in cross-section and formed with spaced slots 212 in its top surface. Pivoted by horizontal longitudinal pivot shaft 213 mounted on side posts 22 are crank members 214. An additional arm 216 of some of crank members 214 is pivoted to rod 217 of cylinder 218 mounted on the side of frame 21. Cranks 214 move inward in the slots 212 in ledge 211 and their inner ends are fixed to longitudinal squaring rails 219.

When the bales tilt transversely, their outer bottom corners normally rest on the top, inward-downward slanted surface of ledge 211. To square the sides, cylinder 218 is energized pushing rail 219 inward and pushing all the bales on that side inward, all in line. The elevation of ledge 211 causes only the inner bottom corners of the bale to engage platform 46 or other bales previously loaded therein. This reduces frictional resistance to squaring action. When the bales clear the inner corner of ledge 211, they all drop to horizontal position, their outer faces in line.

*Operation*

At the commencement of operation, platform 46 is elevated to the position indicated at 46a in FIG. 3 and tailgate 32 is latched closed. The operator steers the machine by steering wheel 43 along a path of bales left by the baling machine. Ordinarily such bales rest on the ground extending approximately longitudinally on one of their 16″ by 48″ faces. The operator steers the machine so that the bale enters between the guides 78 and the back end of bale 10a engages the back of chute 71. Lugs 82 of chains 81 elevate the back end of the bale upwardly and slightly rearwardly until it reaches the top of the chute as indicated by reference numeral 10c in FIG. 4. At this position the guide 89 turns the top end of the bale transversely-inwardly, the bale pivoting around roller 88 on the top of the inner side of chute 71 and the bale falls to the position indicated by reference numeral 10d resting on tilting platform 96 which is in its first position.

Either under manual control of the operator or by automatic means (not shown) responsive to the weight of the bale resting upon the tilting platform 96, cylinder 116 is then energized. At the beginning of this energization, roller 122 causes cam lever 123 to pivot downwardly as viewed in FIGS. 3 and 9, thereby tilting the platform 96 from the first position to the second or upright position 10e of FIG. 4 whereupon the bale rests partially upon horizontal slide 102 and partially on slide 109. By reason of the lost motion connection of slide 133 on rod 134, pusher 111 does not contact bale 10c while platform 96 is tilting, and after platform 96 has tilted to upright position, there is no further tilting thereof. When the slide 133 reaches stop 137 on rod 134, pusher 111 is caused to move rearwardly, pushing the bale off slides 102, 109 and onto the horizontal longitudinal carriage members 146. When the first layer of bales is being loaded, chain 201 is in the position shown in FIG. 3. Four bales 10f are moved sequentially onto the carriage members 146, each successive bail pushing the previous bale rearward until carriage members 146 are filled with the four upright bales. When the carriage 144 is full, the carriage is moved by cylinder 156 laterally to one side and the four bales are caused to tilt transversely by energization of one or the other of cylinders 187. This causes one set of rods 173, 177 to lift out of bale-holding position and also pulls connecting rod 196, pulling the opposite third rod 177 inward and pushing the bales in a transverse tilting direction off carriage 144.

Thereafter four additional bales are installed on carriage 144 in identical fashion, whereupon the carriage is moved to the opposite direction and the second group of four bales is caused to tilt transversely in the opposite direction, thereby filling the first layer of bales. The bales fall with their outer bottom corners resting on ledges 211. The squaring rails 219 on each side of the machine are then moved inward by actuation of cylinders 218, causing the eight bales to be squeezed inward until their ends clear ledge 211, whereupon they drop to horizontal position and the first layer appears as in FIG. 12. Platform 46 is lowered 16 inches and a second layer similar to FIG. 12 is formed in the identical manner.

The procedure for forming the third layer (see FIG. 13) is somewhat different. In this operation, the first bale of the layer is brought into the position indicated by 10f in the same manner as the first bale of the first layer has thus been positioned and chain 201 is moved in counterclockwise direction as viewed in FIG. 3, causing the first bale to fall to position 10h so that it extends longitudinally on one of its 48" by 16" faces. The falling of bale 10h is occasioned by reason of the fact that rods 173, 177 are closer together at the front of the machine than at the rear and create a drag on the top of the bale which, combined with the rearward movement of the lower end of the bale caused by lugs 206, results in longitudinal tilting. Continued operation of chain 201 causes bale 10h to move to the rear of the machine. A second bale is installed on carriage members 146 immediately behind the first mentioned bale 10h of this layer in the same fashion and the first is pushed to the back of the carriage (10j). Carriage 144 is then moved laterally to one side of the machine by means of a cylinder 156 until cam 192 engages cam roller 194. This causes the two bales 10h, 10j to tilt counterclockwise and rest on ledge 211 (10k). An identical operation is performed with the next two bales which are caused to tilt longitudinally in a longitudinal path and then moved to the opposite side of the machine from the first two bales of this layer and tilted transversely as heretofore described. The four center bales of FIG. 13 are positioned on carriage 144 as any four bales of the first layer. Carriage 144 is then moved laterally by cylinder 156 to an intermediate position, cylinders 187 then being energized to tilt the four middle bales. Squaring rails 219 are moved in to squeeze in the two outer (longitudinal) bales on each side, thus completing layer three (FIG. 13).

A fourth layer is formed in the same manner as the first; the fifth layer is formed in the same manner as the third; the top two layers are formed in the same manner as the first layer. After each layer formation, the platform is lowered 16 inches and the outside edges of the stack are squared by inward movement of the squaring rails 219.

When all seven layers are formed, platform 46 is at the level indicated by reference numeral 46b in FIG. 1.

Thereupon the driver steers the machine to a point of deposit.

At the point of deposit, hooks 62, 63 are interengaged, and the forward end of the platform is held up by reason thereof. Further retraction of rod 51 in platform elevating cylinder 49 causes the rear end of the platform to lower so that the platform assumes the downward-rearward tilted position indicated by reference numeral 46c. Tailgate 32 is unlatched. Thereupon cylinder 66 is energized causing pusher 68 to push the entire stack of bales off platform 46c while the driver meanwhile moves the machine forwardly at about the same rate of speed, so that the entire stack is deposited on the ground as a unit, as in FIG. 11.

It will thus be seen that the stack deposited on the ground is square on the sides and that the layers of bales are tied together in a manner which facilitates subsequent lifting of the stack for transportation thereof.

Although the foregoing invention has been described in some detail, by way of illustration and example for purposes of clarity of understanding, it is understood that certain changes and modifications may be practiced within the spirit of the invention and scope of the appended claims.

What is claimed is:

1. Bale stacking apparatus comprising a wheeled frame, a platform vertically reciprocable in said frame, an elevator chute having elevating means for lifting bales from the ground as the frame is moved forwardly to an elevation above said frame adjacent one edge of said platform, a bale support on the top of said frame overhanging said platform, bale transfer means for moving at least one of said bales from the top of said chute onto said bale support, and bale discharging means for discharging said bales off said bale support downwardly onto said platform.

2. Apparatus according to claim 1, in which said bale support accommodates a plurality of bales in side-by-side relation, said bale discharging means discharging said plurality of bales substantially simultaneously.

3. Apparatus according to claim 1, in which said bale discharging means comprises a carriage and guide means for moving said carriage horizontally relative to said frame.

4. Apparatus according to claim 1, in which said bale discharging means comprises on each side of said bale support, an elongated member engaging a side of said bale and supporting it upright and power means for moving one of said members out of engagement with said side of said bale to permit discharging of said bale.

5. Apparatus according to claim 4, in which said bale discharging means further comprises connecting means for interconnecting said members to move the other said member toward said bale when said first-mentioned member is moved away from said bale.

6. Apparatus according to claim 4 in which said power means comprises a fluid cylinder connecting said member and said bale support.

7. Apparatus according to claim 4 in which said bale discharging means comprises a carriage, guide means for moving said carriage horizontally relative to said frame, first cam means on said carriage and second cam means on said frame, said cam means cooperating to actuate said bale discharging means as said carriage moves on said frame.

8. Apparatus according to claim 1 in which said bale discharging means comprises a longitudinal support, feed means for moving a plurality of bales longitudinally of said longitudinal support, and means for pushing bales transversely off said longitudinal support.

9. Apparatus according to claim 8 in which said feed means comprises a longitudinal conveyor having an operative and an inoperative position, said conveyor in operative position engaging a bale on said longitudinal support to tilt said bale longitudinal of said support.

10. Apparatus according to claim 1 which further comprises squaring means along opposed sides of said frame and actuating means to squeeze said squaring means inward to square the outer ends of bales supported on said platform.

11. Apparatus according to claim 10 which further comprises ledges along the upper end of said frame to receive the outer ends of said bales, said squaring means engaging said bales when supported on said ledges to square said bales while tilted downward-inward.

12. Apparatus according to claim 1 which further comprises a pusher and pusher actuating means for pushing said pusher across and above said platform to push bales off said platform onto the ground.

13. Apparatus according to claim 12 which further comprises means for tilting said platform downward in the direction of movement of said pusher when said pusher is operative.

14. Apparatus according to claim 1 in which said bale transfer means comprises a stationary platform remote from the upper end of said chute, transverse transfer means for moving a bale from the top of said chute transversely to said stationary platform, and longitudinal transfer means for moving a bale off said stationary platform onto said bale support.

15. Apparatus according to claim 14 which further comprises energizing means for first actuating said transverse transfer means and then actuating said longitudinal transfer means.

16. Apparatus according to claim 14 in which said transverse transfer means comprises a platform, means pivotally mounting said platform on said frame adjacent said stationary platform for movement between a first position slanted downward-inward from the top of said chute to said stationary platform to a second position upright alongside said stationary platform.

17. Apparatus according to claim 16 which further comprises turning means on the upper end of said chute to turn bales from an upward direction of movement in said chute to a downward-inward direction.

18. Apparatus according to claim 14, in which said longitudinal transfer means comprises a pusher and guide means guiding said pusher for horizontal longitudinal reciprocation between a first position remote from said frame to a second position adjacent said frame.

19. A method of bale stacking which comprises elevating bales of four long and two shorter dimension sides from ground level to a first position at a level above the ground, transferring said bales at said elevated level in a substantially horizontal direction to a second position remote from said first position, supporting said bales on one of said shorter-dimension sides in second position, tilting said bales from second position to fall in third position on one of said long dimension sides to form a first layer of bales, lowering said first layer of bales from third position to fourth position below said third position, and superimposing a second layer of bales on top of said first layer.

20. The method of claim 19, in which the bales of said first layer are tilted to lie all in the same direction and in which at least some of the bales in said second layer are tilted to lie at right angles to said bales in said first layer.

21. The method of claim 19, in which said step of transferring said bales includes first moving said bales in one direction and then moving said bales substantially at right angles to said one direction.

References Cited

UNITED STATES PATENTS

| 2,372,902 | 4/1945 | Lewis | 214—6 X |
| 2,639,024 | 5/1953 | Kneer | 214—16 X |
| 2,729,345 | 1/1956 | Gisleson | 214—16 |
| 2,947,405 | 8/1960 | Fenton | 214—6 X |
| 3,139,196 | 6/1964 | Legocki | 214—6 |
| 3,197,043 | 7/1965 | Unger | 214—6 |

ROBERT G. SHERIDAN, *Primary Examiner.*

R. J. SPAR, *Assistant Examiner.*